Feb. 15, 1927.
K. A. WEBER
1,617,469
MOLDING RUBBING APPARATUS
Filed March 2, 1925      2 Sheets-Sheet 1
Fig. 1.
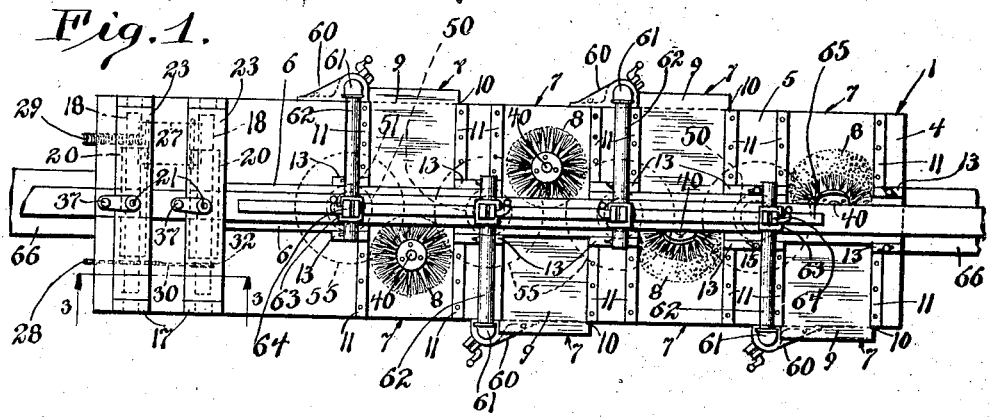
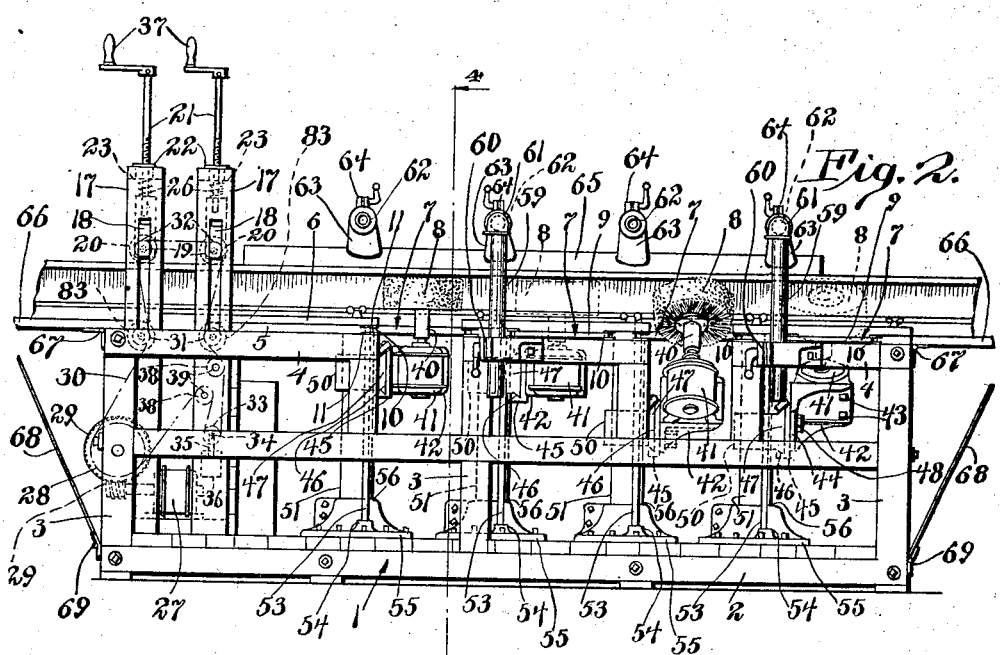
Fig. 2.
Fig. 7.
Inventor
Karl Albert Weber,
By Lyon & Lyon
Attorneys Feb. 15, 1927.
K. A. WEBER
1,617,469
MOLDING RUBBING APPARATUS
Filed March 2, 1925   2 Sheets-Sheet 2
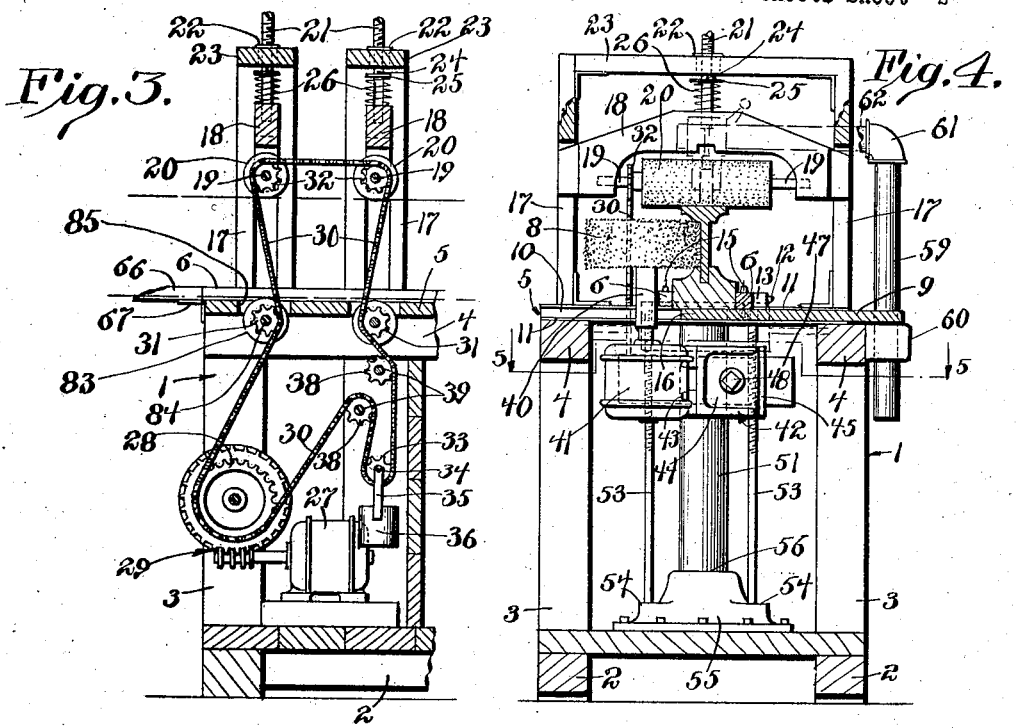
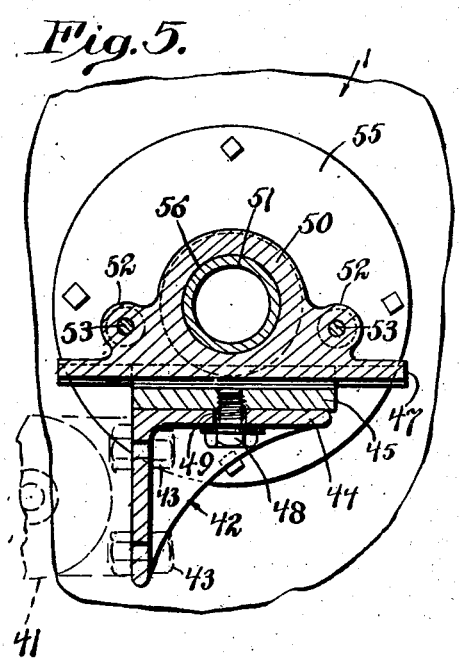
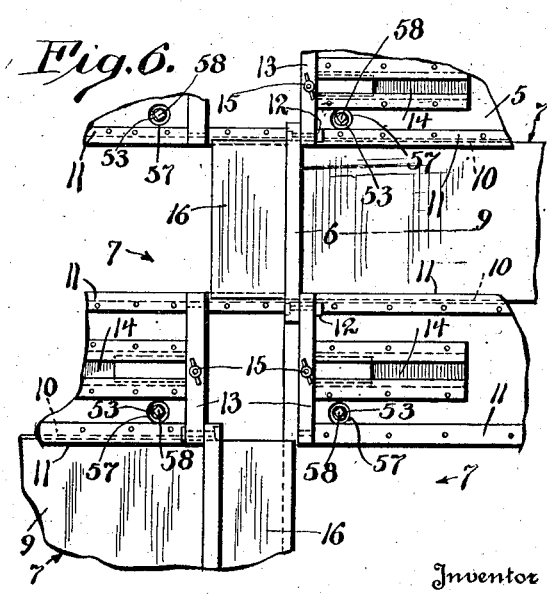
Inventor
Karl Albert Weber
By Lyon & Lyon
Attorneys.

Patented Feb. 15, 1927.

1,617,469

UNITED STATES PATENT OFFICE.

KARL ALBERT WEBER, OF LOS ANGELES, CALIFORNIA, ASSIGNOR TO WEBER SHOWCASE & FIXTURE COMPANY, OF LOS ANGELES, CALIFORNIA, A CORPORATION OF CALIFORNIA.

MOLDING-RUBBING APPARATUS.

Application filed March 2, 1925. Serial No. 12,626.

This invention relates to molding rubbing apparatus, and is more particularly directed to an apparatus for rubbing molding such as used in the construction of sectional partitions, showcases, furniture, and the like.

The polishing and rubbing of molding having irregular surfaces is a difficult operation which has heretofore been accomplished mostly by manual labor, which is slow, expensive and does not produce a uniform surface. Skilled labor is required and as the surfaces are often of extreme irregularity, it is difficult for the one rubbing these surfaces to reach the bottom of some of the curved surfaces so as to in any way efficiently rub or polish the same.

It is therefore an object of this invention to provide a machine which will automatically rub the irregular surfaces of molding and which is adapted to rub evently all the surface of the molding, irrespective of their irregularity.

It is an object of this invention to provide an apparatus through which the material to be rubbed is automatically driven, and in which means are provided so that the apparatus may be adjusted for a wide range of different sizes and shapes of material so that the same will be evenly and uniformly rubbed.

Another object of this invention is to provide a universal mounting for the rubbing elements so that the elements are adjustable so as to enable the same to be adjusted to any position required by the irregularity of the surface of the material.

Other objects and advantages of this invention will be apparent from the following detailed description of a preferred embodiment thereof, as illustrated in the accompanying drawings.

In the drawings:

Fig. 1 is a top plan view of a molding rubbing apparatus embodying this invention.

Fig. 2 is a front side elevation thereof.

Fig. 3 is a fragmental end elevation taken substantially on the line 3—3 of Fig. 1.

Fig. 4 is an end elevation taken substantially on the line 4—4 of Fig. 2.

Fig. 5 is a fragmental plan view taken substantially on the line 5—5 of Fig. 4, illustrating one of the universal adjusting and holding means provided for the rubbing elements.

Fig. 6 is a fragmental top plan view illustrating a manner of adjustment of the molding guides.

Fig. 7 is a fragmental view showing a form of locking means for holding the rubbing elements in transverse adjustment.

In the preferred embodiment of this invention shown in the drawings, 1 generally indicates a frame comprising a lower base 2 to which a plurality of uprights 3 are secured, to which uprights upper longitudinally extending frame members 4 are secured. A platform 5 is secured to the members 4 and is provided with guide rails 6 between which the molding to be rubbed is driven by any suitable means, such as will hereinafter be described.

The platform 5 comprises a plurality of sections 7 into any one of which a polishing element 8 may be inserted in the proper position in relation to the molding being driven between the guides 6. The guides 6 are constructed in sections at the points where the elements 8 are inserted to rub the molding. These sections 6 are secured to adjustable base plates 9 mounted to slide within grooves 10 formed in the base 5 by means of a pair of strips 11 of metal. At these sections 7 wherein the rubbing elements 8 are inserted, one section of the guide rails 6 is omitted so as to permit ease of access of the element 8 to the molding, the opposite guide rail 6 being secured to the base plate 9 is adjusted in position by means of bolts 12, which bolts 12 pass through the ends of the bars 13, which bars 13 are mounted in slides 14 formed in the base plate 5. The members 13 are adjustable to and from each other in the slides 14 and are secured in position by means of thumb screws 15. The members 6 are secured to the adjustable base plates 9 at a point spaced from the inner ends of the plates 9 so that when the members 6 are adjusted in position a portion 16 of the base plate 9 will extend beyond the guides 6 and provide a slide upon which the molding travels.

Mounted upon one end of the members 4 are standards 17 in which standards 17 slides 18 are slidably mounted in slots formed in the standards 17 so as to be adjustable vertically. Mounted in each slide 18 is a shaft 19 upon which shaft a roller 20 is secured, and which roller 20 has an abrasive surface so as to maintain a frictional engagement with the upper surface of the molding.

Means are provided for adjusting the position of the roller 20 and for yieldably urging the roller 20 downward into position to engage the molding, which means are preferably composed of a shaft 21 screw threaded into a nut 22 secured to the transverse member 23 connecting the opposite sides of the standards 17. Secured to the shaft 21 by means of pins 24 are washers 25, the under edges of which washers 25 are engaged by a spring 26 mounted upon the shaft 21 so as to engage at its opposite end the upper edge of the slide 18. The spring 26 yieldably urges the roller 20 into engagement with the upper surface of the molding. The rollers 20 are driven by any suitable means, one form of which means is illustrated as comprising a motor 27, adapted to drive a chain sprocket 28 by means of a worm gear 29, over which sprocket 28 a chain 30 is trained, and which chain passes over guide sprockets 31 and drives the sprockets 32 keyed or otherwise secured to the shafts 19. Rollers 83 are secured to the shafts 84 to which shafts 84 the sprockets 31 are keyed or otherwise secured. The rollers 83 are preferably of soft resilient material, such as soft rubber, and extend upward through slots 85 formed in the platform 5 to engage the under edge of the molding. The sprockets 31 have the additional function of driving the rollers 83 to aid in the forcing or driving of the molding along the platform 5.

Means are provided for maintaining the chain 30 in driving engagement with the sprockets 28 and 32, which means preferably comprise a sprocket wheel 33 which is mounted upon a pin 34, which pin is secured within a bracket 35 which bracket 35 carries a weight 36, so that as the handles 37 of the shafts 21 are turned to raise or lower the rollers 20, the length of the chain is compensated.

In order to maintain the chain in its correct position to support the weight 36, a pair of idler sprockets 38 are mounted upon pins 39 secured to one of the uprights 3.

The rubbing elements 8 are preferably in the nature of bristle brushes and are mounted upon shafts 40, which shafts are driven by an electric motor 41, which motor is secured to plates 42 by any suitable means such as illustrated at 43. The plates 42 have a downwardly extending section 44 which is secured to a guide plate 45 in which guide plates guides 46 are formed, adapted to receive the transversely extending guide members 47 so that the elements 8 are adjustable to or from the molding. The downwardly extending portion 44 of the plate 42 is secured to the guide plate 45 by means of a bolt 48 which passes through a bore 49 formed in the portion 44 and is screw-threaded into the guide plate 45 so that by unscrewing the bolt 48 the motor 41, and hence the rubbing element 8, may be rotated in a vertical plane. The guide 47 is secured to a ring 50 through which ring a post 51 passes.

Bosses 52 are formed on opposite sides of the ring 50 and are provided with interior threads into which threaded shafts 53 are fitted, and which shafts 53 are mounted within bearing members 54 formed in the base supports 55, which base supports 55 likewise support the posts 51 as illustrated at 56. The shafts 53 extend upward through the bearing members 57 and are provided with square heads 58 adapted to receive a wrench or other suitable means so that the same may be turned to raise or lower the motor 41 and the rubbing element 8 to its proper position in relation to the molding.

In order to lock the rubbing elements 8 in the adjusted position on the guides 47 the guide plate 45 has one guide block 80 formed separate from the plate 47 and adapted to be locked in position by means of set screws 81. The surface 82 of the plate 45 is formed to approximate the desired slope of the block 80 and is cut back so that the block 80 may be set up tight on the guide 46 by means of the set screws 81 to lock the guide plate 45 in adjusted position.

In order to maintain the molding in position during the rubbing, a plurality of posts 59 are secured in staggered relation to the opposite sides of the frame 1 by any suitable means, such as the pinch clamps 60. Secured to the upper ends of the posts 59 by any suitable means such as an elbow 61, are arms 62, to the end of which arms 62 holding members 63 are secured by any suitable means, such as the fixed clamps 64. The holding members 63 are adapted to hold and support a board or other suitable means 65 adapted to engage the upper edge of the molding to retain the same in a proper position as the same is driven between the guides 6. In order to provide a support for the molding at the ends of the frame 1, leaves 66 are hinged to the frame, as illustrated at 67, and supports 68 are hinged to the base 2 as illustrated at 69, so as to be in position to engage the under edge of the leaves 66 to retain the same in horizontal position.

Having fully described a preferred embodiment of this invention, it is to be understood that it is not intended that the same should be limited to the exact construction herein set forth, but that the invention is of the scope of the appended claims.

What I claim is:

1. In an apparatus of the class described, the combination of a frame, a platform forming a runway for the work supported by the frame, a plurality of rubbing elements mounted within the frame adjacent the runway, means for adjusting the position of the said rubbing elements to and from the runway, means for adjusting in a vertical plane the angular position of the said elements relative to the work, and means for supporting the said elements at a plurality of spaced points along the runway.

2. In an apparatus of the class described, the combination of a frame, a platform supplying a runway for the work, a plurality of rubbing elements, means for supporting the said elements at staggered points on opposite sides of the said runway, means for adjusting the position of said elements to and from the runway, and means for adjusting in a vertical plane the angular position of the said elements relative to the work.

3. In an apparatus of the class described the combination of a frame, a platform supported by the frame, the platform being formed in sections, a guide rail secured to each section, means for adjusting the position of the sections, and rubbing means adapted to be positioned within the recesses formed in the platform by the adjustment of the sections.

4. In an apparatus of the class described, the combination of a frame, a platform supplying a runway for the work, means for driving the work along the runway, means for guiding the work along the runway, means for supporting a plurality of rubbing elements on opposite sides of the runway, and means for adjusting in a vertical plane the angular position of the said elements relative to the work.

Signed at Los Angeles, California, this 19 day of February 1925.

KARL ALBERT WEBER.